United States Patent [19]

Iwami

[11] 4,345,574
[45] Aug. 24, 1982

[54] SECONDARY AIR FEEDER FOR AN INTERNAL COMBUSTION ENGINE

[76] Inventor: Tadakatsu Iwami, 374, Shikisai, Himeji-shi, Hyogo-ken, Japan

[21] Appl. No.: 109,402

[22] Filed: Jan. 3, 1980

[30] Foreign Application Priority Data

Mar. 27, 1979 [JP] Japan .............................. 54/41633[U]

[51] Int. Cl.³ ...................... F02M 23/12; F02M 29/02
[52] U.S. Cl. .................................. 123/587; 123/590; 261/79 R
[58] Field of Search ...................... 123/590, 587, 585; 261/79 R

[56] References Cited

U.S. PATENT DOCUMENTS

| 3,437,467 | 4/1969 | Jacobus | 123/590 |
| 4,100,900 | 7/1978 | Straub | 123/587 |
| 4,130,099 | 12/1978 | Ferguson | 123/590 |
| 4,187,819 | 2/1980 | Longobardi | 123/590 |

Primary Examiner—Charles J. Myhre
Assistant Examiner—E. Rollins Cross
Attorney, Agent, or Firm—Wenderoth, Lind & Ponack

[57] ABSTRACT

A secondary air feeder for an internal combustion engine, including a vortex chamber provided between a carburetor and a suction pipe. The air supply to the vortex chamber is regulated by an air supply regulator, in which a valve is opened and closed in accordance with the engine speed.

4 Claims, 8 Drawing Figures

SECONDARY AIR FEEDER FOR AN INTERNAL COMBUSTION ENGINE

BACKGROUND OF THE INVENTION

The present invention relates to a secondary air feeder for an internal combustion engine.

In order to permit the complete combustion of an air-fuel mixture in an internal combustion engine, it has been a common practice to mix secondary air with the air-fuel mixture. However, it has been extremely difficult to automatically control the amount of secondary air in accordance with the running condition of the engine. As a consequence, a condition frequently occurred wherein the engine was oversupplied with secondary air at the time of idling, while the engine ran short of secondary air when the automobile was either accelerated or moving at a high speed.

In addition, it is obvious that a secondary air supply per se does not necessarily lead to a complete combustion of an air-fuel mixture or to a sharp decrease in harmful ingredients of waste gas such as CO, HC and $NO_x$.

SUMMARY OF THE INVENTION

It is an object of the present invention to solve these problems with a view to purifying waste gas and increasing the engine capacity.

It is an object of the present invention to provide a secondary air feeder in which the straight flow of an air-fuel mixture supplied from a carburetor is changed into vortex motion so that coarse particles of gasoline contained in the air-fuel mixture may be made into fine particles and perfectly diffused, thereby facilitating a complete combustion of the airfuel mixture.

It is another object of the present invention to provide a secondary air feeder in which negative pressure in the passage of the air-fuel mixture is utilized for the suction of secondary air.

It is still another object of the present invention to provide a secondary air feeder which permits adjustment of the amount of secondary air in accordance with the running condition of the internal combustion engine so that the engine will be supplied with an optimum amount of secondary air in any running condition.

BRIEF DESCRIPTION OF THE DRAWINGS

With these objects in view which will become apparent from the following detailed description, the present invention will be more clearly understood in connection with the accompanying drawings, in which.

DESCRIPTION OF PREFERRED EMBODIMENTS

Figure 1:
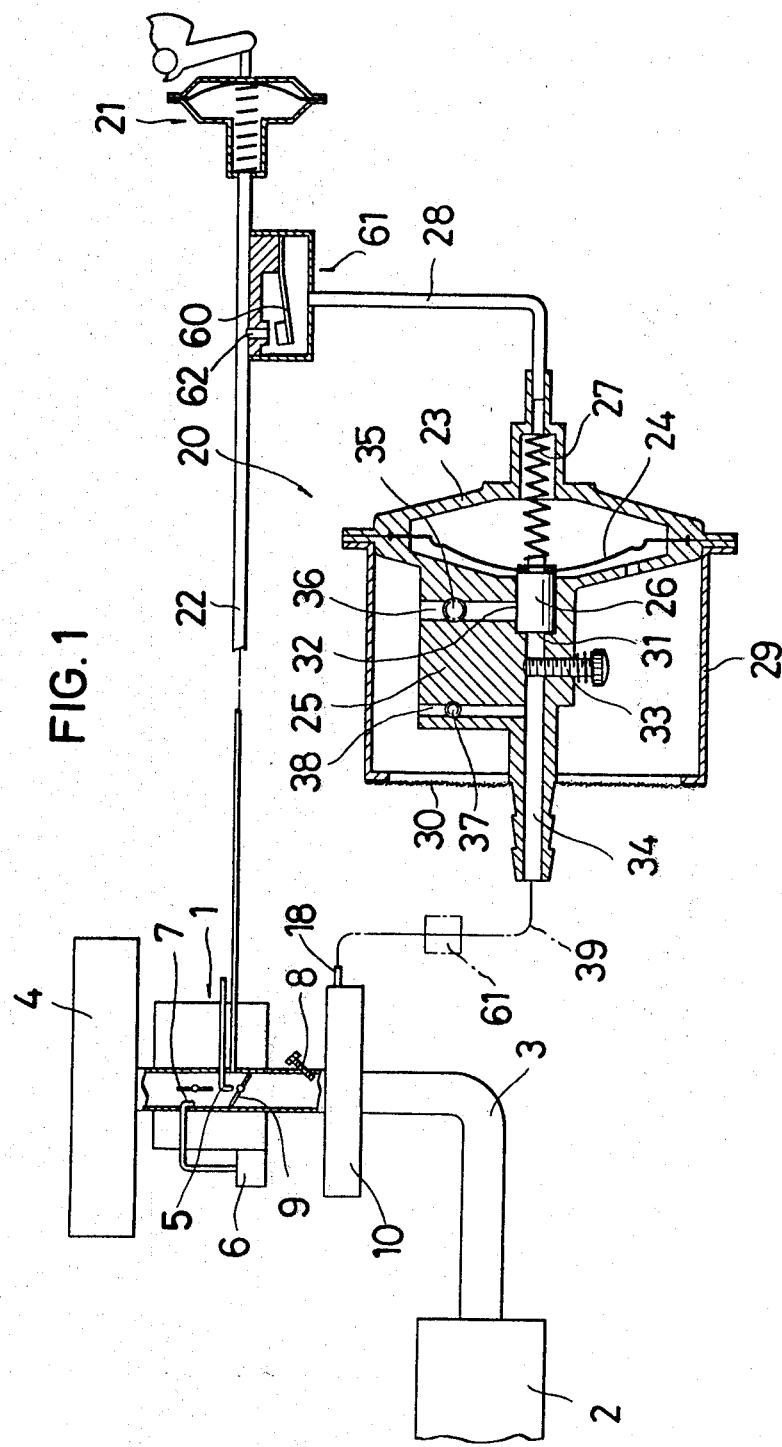
FIG. 1 is a partly diagrammatic sectional view of a secondary air feeder in accordance with the present invention, including the first embodiment of an air supply regulator.
Figure 2:
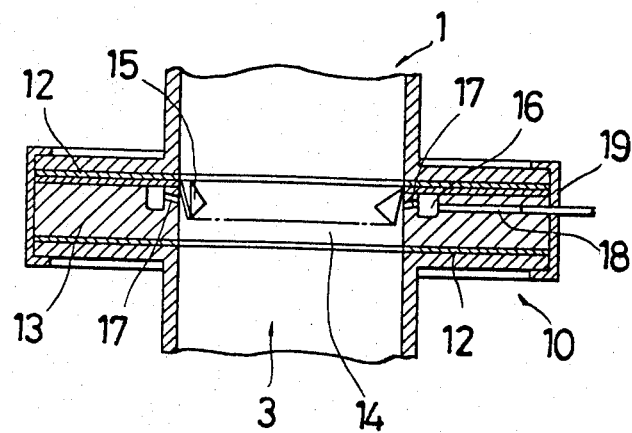
FIG. 2 is an enlarged vertical section of the vortex chamber used therein.
Figure 3:
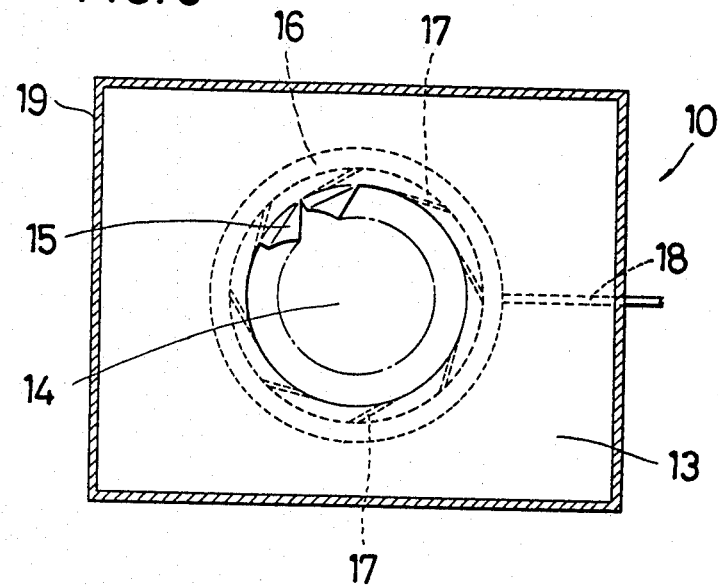
FIG. 3 is a horizontal sectional view of the same.

Referring now to FIGS. 1–4, a secondary air feeder in accordance with the present invention includes a vortex chamber 10 provided between a carburetor 1, which is connected to a vacuum advance 21 by a pipe 22, and a suction pipe 3 through which an air-fuel mixture passes from the carburetor 1 to an engine 2. The air supply to the vortex chamber 10 is regulated by an air supply regulator 20 which communicates with the pipe 22 through a pipe 28.

The vortex chamber 10 includes a heat insulator 13 sandwiched between two heat-sealed plates 12 in which a cylindrical hole 14 having the same diameter as the inside diameter of the suction pipe 3 is provided. The heat insulator 13 and the heat-sealed plates 12 are held firmly by means of a clamp 19 between a flange provided at the outlet of the carburetor 1 and a flange provided at the upper end of the suction pipe 3 in such a manner that the hole 14 is aligned with the axis of the suction pipe 3. A plurality of fins 15b are provided on the upper brim of the hole 14.

Figure 4:
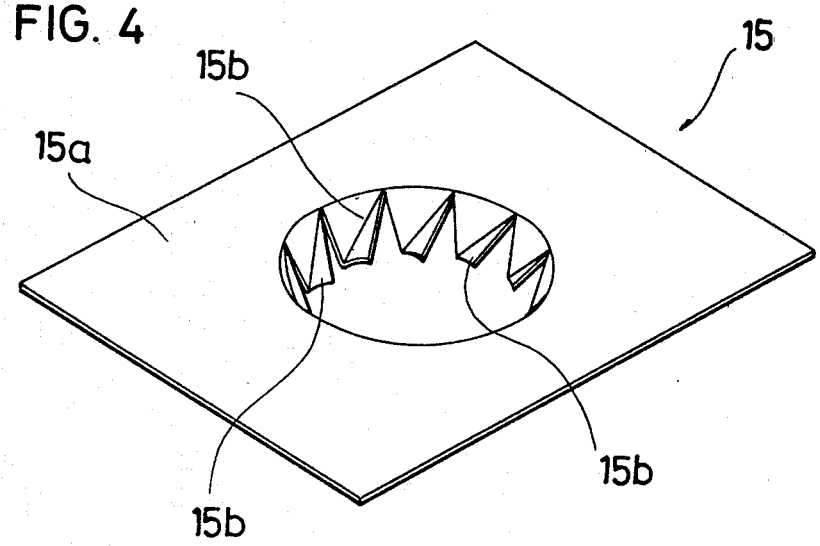
FIG. 4 is a perspective view of the fin plate used therein.

Referring now to FIG. 4, the fins 15b are formed by punching a hole, which is smaller than the hole 14, in the central part of a fin plate 15 and then by making radial cuts at regular intervals in the edge of the hole so that the roots of the radial cuts reach the edge of the hole 14. A plurality of inward projections thus made substantially in the forms of isosceles trapezoids are firstly bent downwardly along the lines connecting the roots of the cuts and then bent inwardly along one same diagonal line of each isosceles trapezoid.

Referring now again to FIGS. 1, 2 and 3, an annular air chamber 16, formed in the heat insulator 13 concentrically with the hole 14, communicates with the hole 14 by a plurality of angularly spaced air vents 17 which are tilted in such a manner that together with the fins 15b, they are adapted to cause vortex motion of secondary air in the hole 14. The annular air chamber 16 is supplied with secondary air from the air supply regulator 20 through an inlet pipe 18.

Air passing through a filter 4 and fuel sprayed by a fuel injection nozzle 5 are mixed with each other in the carburetor 1 so as to produce an air-fuel mixture. When the air-fuel mixture flows into the vortex chamber 10, coarse particles of gasoline imperfectly diffused in the air-fuel mixture are made into fine particles and fairly diffused by the fins 15, and so are the drops of gasoline which fall from an idling port 8 while the engine 2 is idling or from an accelerator nozzle 7 while an accelerator pump 6 is working.

Diffusion of the coarse particles or drops of gasoline is further expedited by their susceptibility to the influence of centrifugal force in the course of vortex motion because of their larger specific gravity than that of the air. By the centrifugal force, the coarse particles of gasoline in the suction pipe 3 are blown outwardly against the internal surface thereof, and evaporated by the heat from the hot suction pipe 3.

Negative pressure in the suction pipe 3 causes an inflow of secondary air into the hole 14 through the inlet pipe 18, the annular air chamber 16, and the air vents 17. The resistance of the fins 15 to the air-fuel mixture, which is detrimental to the suction efficiency, is reduced by the inflow of secondary air, because the secondary air compensates for negative pressure which is apt to be produced at the back of the fins 15 by the vortex motion of the air-fuel mixture.

The air supply regulator 20 includes a casing 29, a diaphragm housing 23 provided on one side of the casing 29, an air filter 30 provided on the opposite side of the casing 29, a block 25 mounted in the casing 29 so as to abut the diaphragm housing 23, a diaphragm 24 mounted in the diaphragm housing 23, a piston 26 fixed to one side of the diaphragm 24 and received within a cylindrical bore formed in the block 25, and a compression coil spring 27, one end of which is attached to the other side of the diaphragm 24 so as to urge the piston 26 into the bore. The other end of the compression coil spring 27 fits in a recess formed in a projecting part of the diaphragm housing 23 from which the pipe 28 extends.

The outside air is admitted into the cylindrical bore through the air filter 30, the space between the casing 29 and the block 25, and a main inlet hole 36 provided in the block 25 and having a port 32 as an inlet to the cylindrical bore. The air is allowed to flow out of the port 32 and into the vortex chamber 10 through an outlet port 31, an outlet pipe 34 extending from the block 25, and a pipe 39 connecting the outlet pipe 34 with the inlet pipe 18 of the annular air chamber 16.

When the engine 2 is idling, the quantity of the air-fuel mixture flowing into the suction pipe 3 is small and the negative pressure in the vacuum advance 21 is not high enough to draw the diaphragm 24 rightwardly in FIG. 1 against the tension of the coil spring 27. Consequently, both the inlet port 32 and the outlet port 31 are kept closed by the piston 26, and the secondary air to be supplied to the vortex chamber 10 passes through an auxiliary inlet hole 38 provided in the block 25 so as to bypass the cylindrical bore and allow the space between the casing 29 and the block 25 to directly communicate with the outlet pipe 34. A throttle valve 37 provided in the auxiliary inlet hole 38 is set at a suitable opening so as not to put the idling of the engine 2 in a bad condition by an inadequate quantity of the secondary air.

When the automobile is either accelerated or moving at a constant speed, the negative pressure in the vacuum advance 21 becomes high enough to draw the diaphragm 24 rightwardly in FIG. 1 against the tension of the coil spring 27. Consequently, the piston 26 shifts rightwardly until not only the outlet port 31 but also the inlet port 32 open, thereby allowing the main inlet hole 36 to communicate with the outlet pipe 34. Throttle valves 35 and 33 provided in the main inlet hole 36 and the outlet pipe 34, respectively, are set at suitable openings so as to match the quantity of the secondary air with a comparatively large quantity of the air-fuel mixture flowing into the suction pipe 3. Either of these two throttle valves may be omitted.

Figure 5:
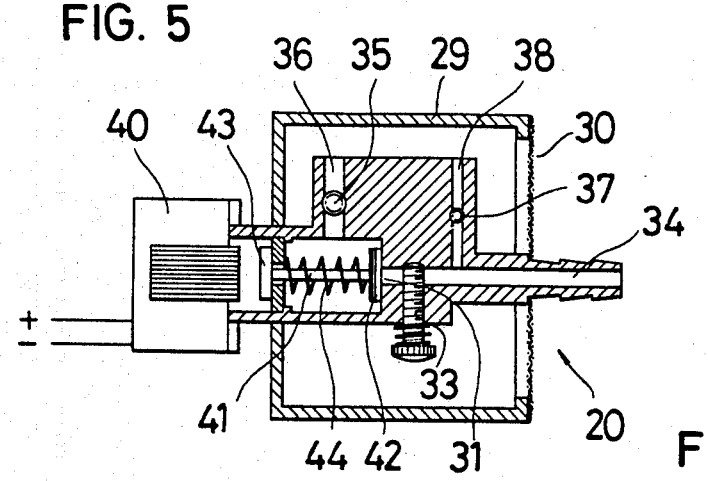
FIGS. 5 to 8 are cross-sectional views of the second to fifth embodiments of the air supply regulator.

Referring now to FIG. 5, the electrical opening of the outlet port 31 constitutes a characteristic feature of the second embodiment of the air supply regulator 20. The rubber-coated surface of a valve 42 provided at one end of a valve stem 41 is pressed against the outlet port 31 by the tension of a coil spring 44. When the automobile is either accelerated or moving at a high speed, an electromagnet 40 attracts a piece of iron 43 provided at the other end of the valve stem 41 and thereby opens the outlet port 31.

The electromagnet 40 can be magnetized in various ways. By way of example, the power circuit for the electromagnet 40 may be adapted for being kept closed as long as the driver keeps his foot on the accelerator (not shown). By way of another example, the circuit for the electromagnet 40 may be adapted for being energized by the pulses (i.e., an intermittent current) supplied from the distributor (not shown) in excess of a preset pulse repetition rate.

Figure 6:
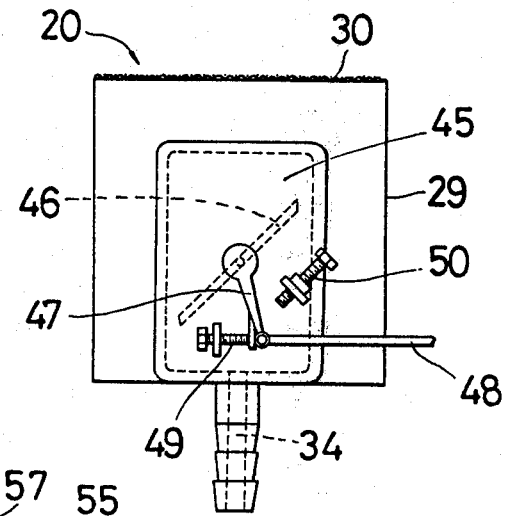

Referring now to FIG. 6, the mechanical opening and closing of a valve 46 for the outlet pipe 34 constitutes a characteristic feature of the third embodiment of the air supply regulator 20. A valve chest 45 containing the valve 46 is provided in the casing 29 so as to abut on the side opposite to the side provided with the air filter 30. One end of an arm 47 is fixed to the central part of the valve 46, while the other end of the arm 47 is connected with a link or wire 48 which is adapted for being drawn rightwards when the driver steps on the accelerator. Screws 49 and 50, which are provided to set limits to the swinging movement of the arm 47, are used to regulate the minimum and maximum opening of the valve 46, respectively.

Figure 7:
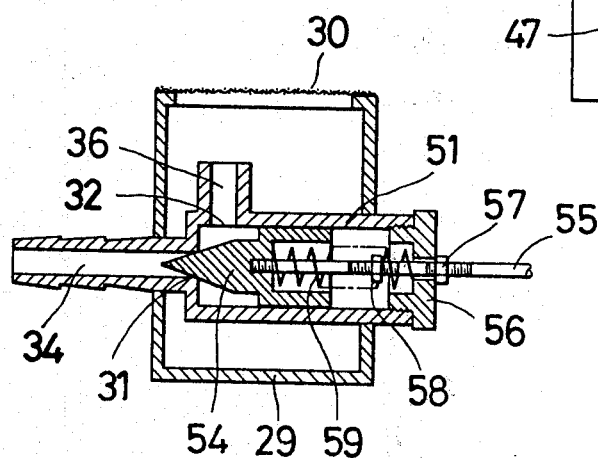

Referring now to FIG. 7, the fourth embodiment of the air supply regulator 20 includes a cylinder 51 contained in the casing 29, a piston valve 54 fitting within the cylinder 51, and a cap nut 56 screwed into the cylinder 51 on the side opposite to the side provided with the outlet port 31. The conical surface of the piston valve 54 is pressed against the outlet port 31 by the tension of a coil spring 59 held between the piston valve 54 and the cap nut 56. A rod 55, one end of which is screwed into the piston valve 54, extends through a hole provided in the center of the cap nut 56 and is adapted for pulling the piston valve 54 rightwards against the tension of the coil spring 59 when the driver steps on the accelerator. Nuts 57 and 58 screwed on the rod 55 outside and inside the cap nut 56, respectively, are used to regulate the minimum and maximum opening of the outlet port 31, respectively.

Figure 8:
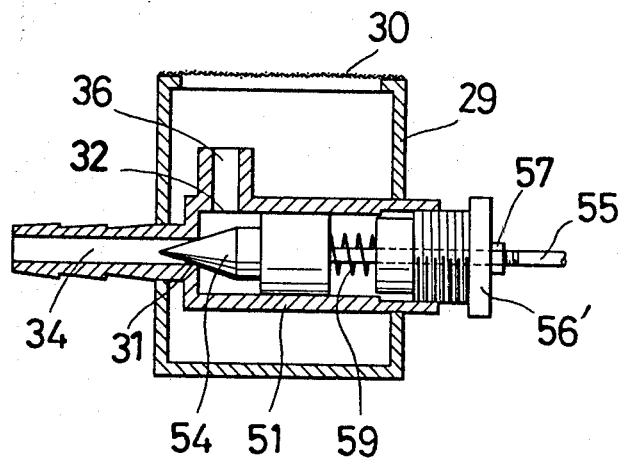

Referring now to FIG. 8, the fifth embodiment of the air supply regulator 20 is provided with a cap nut 56' in place of the cap nut 56 in the fourth embodiment. The axial dimension of the cap nut 56' is much larger than that of the cap nut 56, so that the nut 58 can be omitted.

Referring now again to FIG. 1, a thermostatically controlled regulator 61 is provided at the junction of the pipes 22 and 28. When the ambient temperature in the hood (not shown) falls, e.g., below 30° C., a bimetal tongue 60 provided in the regulator 61 bends until a hole 62 closes so as not to allow the negative pressure in the vacuum advance 21 to draw the diaphragm 24 rightwardly. Thus the regulator 61 serves for the prevention of misfire, a drop in the engine capacity, etc. which are apt to be caused by an inflow of extremely cold secondary air during the cold season.

In the case of the second to fifth embodiments of the air supply regulator 20 shown in FIGS. 5 to 8, which are not provided with the pipe 28 for communication with the pipe 22, the thermostatically controlled regulator 61 may be provided in the middle of the pipe 39. This alternate location of the regulator 61 is also useable for the first embodiment of the air supply regulator 20 shown in FIG. 1.

An internal-combustion engine provided with a secondary air feeder in accordance with the present invention has several advantages. First, the engine is allowed to develop a higher output for an equal fuel consumption in comparison with a conventional engine not provided with the secondary air feeder. Secondly, fuel can be saved if an engine provided with the secondary air feeder has only to develop an output equal to that of an engine not provided with the secondary air feeder. Lastly, since coarse particles of gasoline are made into fine particles and perfectly diffused in the air-fuel mixture, the air-fuel mixture is allowed to burn completely in an engine provided with the secondary air feeder and thereby the generation of harmful ingredients of waste gas, such as CO, HC and $NO_x$, is minimized.

While I have disclosed several embodiments of the present invention, it is to be understood that they have been given by way of example only and not in a limiting sense, the scope of the present invention being determined by the objects and the claims.

What I claim is:

1. A secondary air feeder for an internal combustion engine, comprising a vortex chamber provided between a carburetor and a suction pipe and an air supply regulator communicating with said vortex chamber for serving as a secondary air intake, said vortex chamber including a plurality of fins provided on the upper brim of a hollow cylindrical portion formed therein, an annular air chamber formed around said fins concentrically with a passage of said vortex chamber and a plurality of air vents communicating with the back side of said fins from said annular air chamber, each of the free ends of said fins being bent slightly, inwardly of the inner diameter of said passage, said air vents being tilted relative to said passage, and said annular air chamber being provided with an inlet pipe communicating with said air supply regulator.

2. The secondary air feeder as set forth in claim 1, wherein said vortex chamber comprises two heat-sealed plates provided with circular holes having the same diameter as the inside diameter of said suction pipe, a heat insulator sandwiched between said two heat-sealed plates and provided with a cylindrical hole having the same diameter as the inside diameter of said suction pipe, a clamp for holding said heat insulator and said two heat-sealed plates between a flange provided at the outlet of said carburetor and a flange provided at the upper end of said suction pipe in such a manner that the centers of said holes are aligned with the axis of said suction pipe.

3. The secondary air feeder as set forth in claim 1, wherein said fins are formed by punching a hole in the central part of a plate, making radial cuts at regular intervals in the edge of said hole such that the roots of said radial cuts coincide with the internal surface of said vortex chamber, thus making a plurality of inward projections substantially in the forms of isosceles trapezoids, bending said inward projections downward along lines connecting said roots of said cuts, and bending inwards along the corresponding diagonal line of each of said isosceles trapezoids.

4. The secondary air feeder as set forth in claim 1, wherein said air supply regulator comprises a diaphragm housing communicating with a vacuum advance by means of by a pipe, a cylindrical bore abutting on said diaphragm housing and provided with an air inlet port and an air outlet port, a diaphragm incorporated in said diaphragm housing, a piston fixed to one side of said diaphragm and fitting within said cylindrical bore so as to traverse said air inlet port and said air outlet port, and a compression coil spring attached to the other side of said diaphragm so as to constantly press said piston toward the innermost recess of said cylindrical bore.

* * * * *